F. G. RUX.
AUTOMATIC CAR HOSE COUPLING.
APPLICATION FILED JULY 19, 1909.
988,511.
Patented Apr. 4, 1911.
3 SHEETS—SHEET 2.
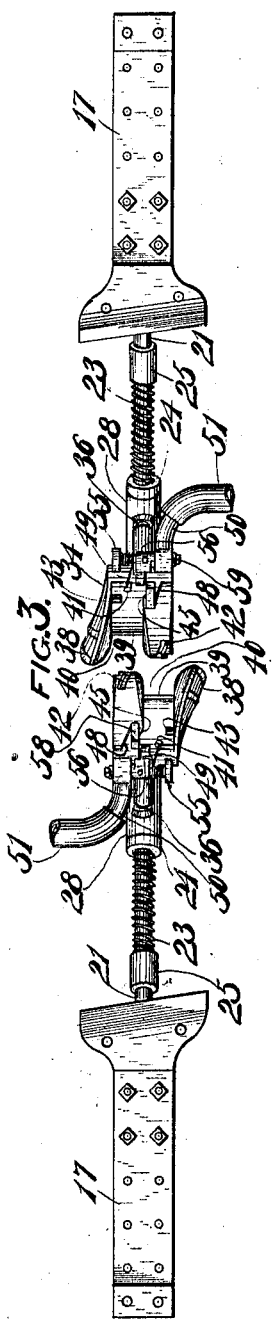
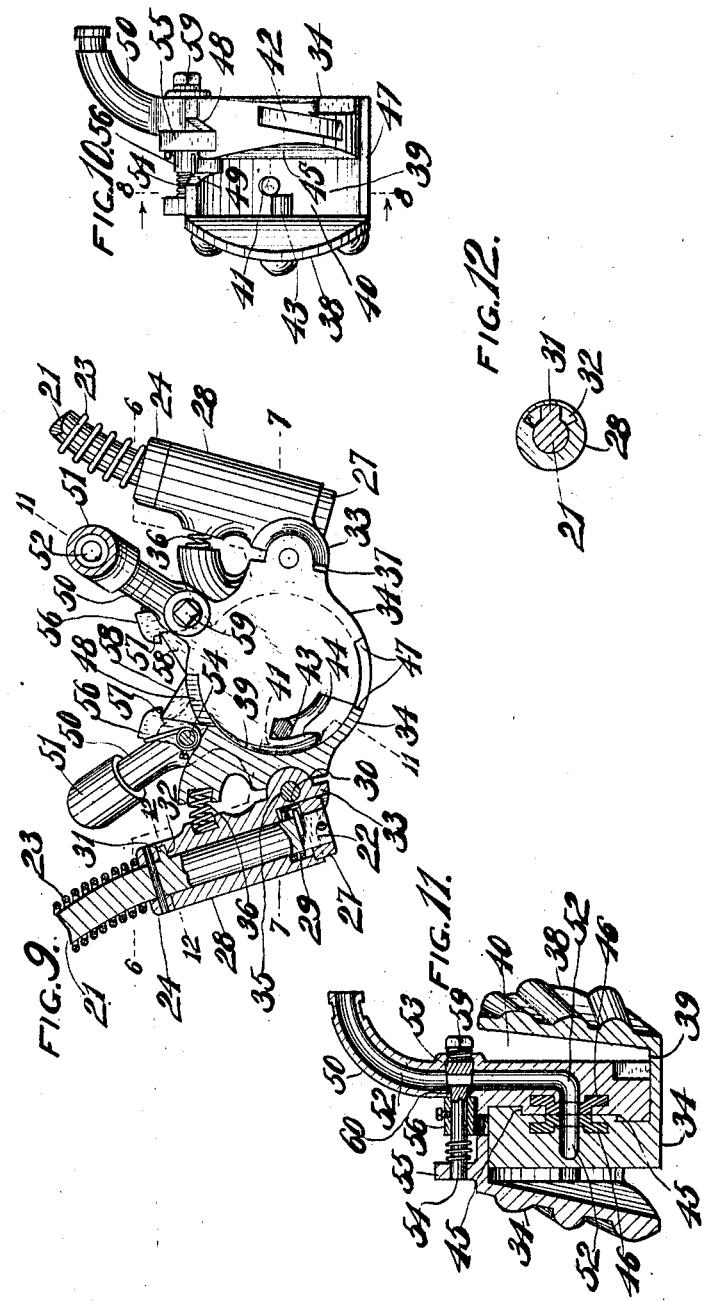
WITNESSES.
INVENTOR.
Ferdinand G. Rux
By Benedict, Morsell & Caldwell
ATTORNEYS.

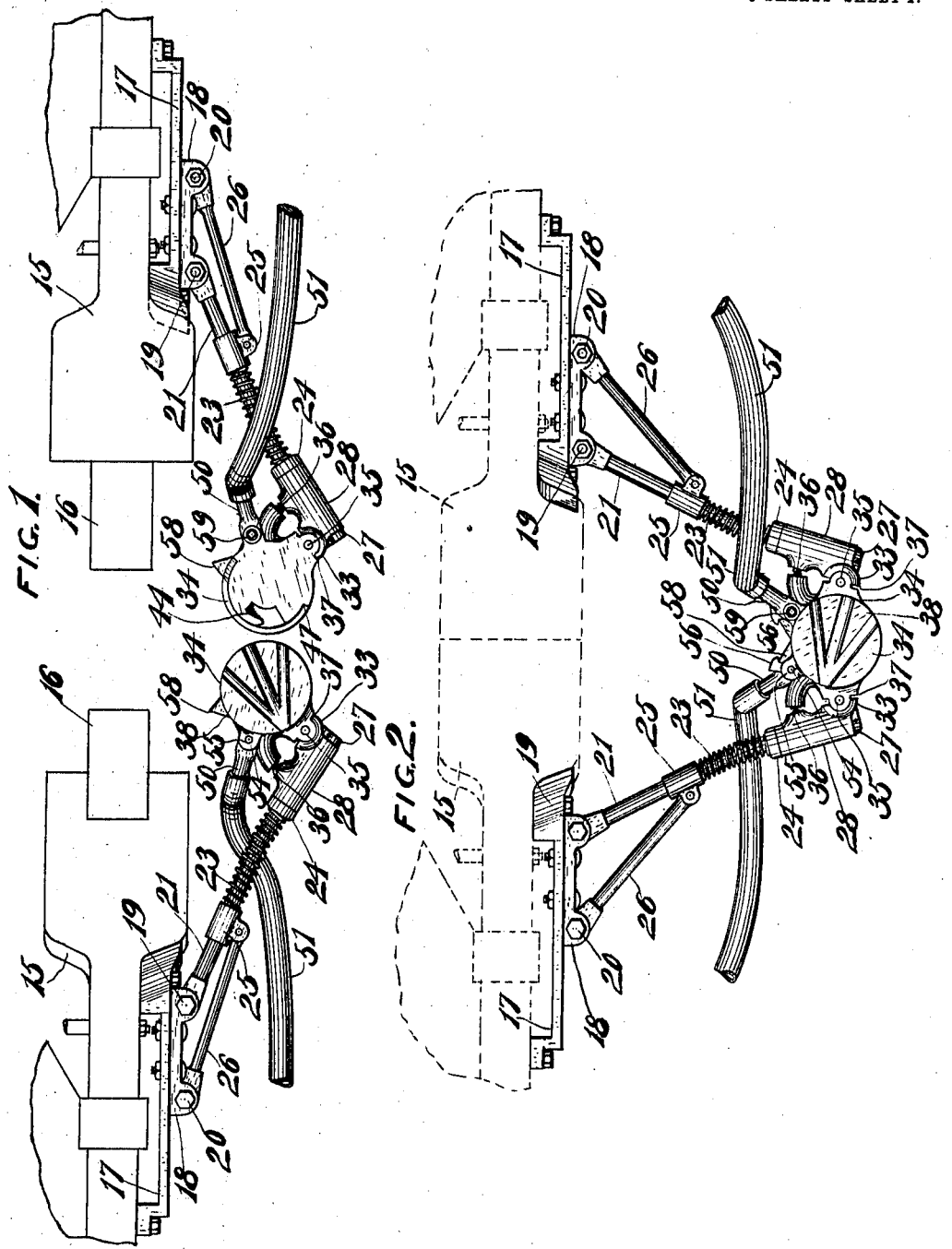

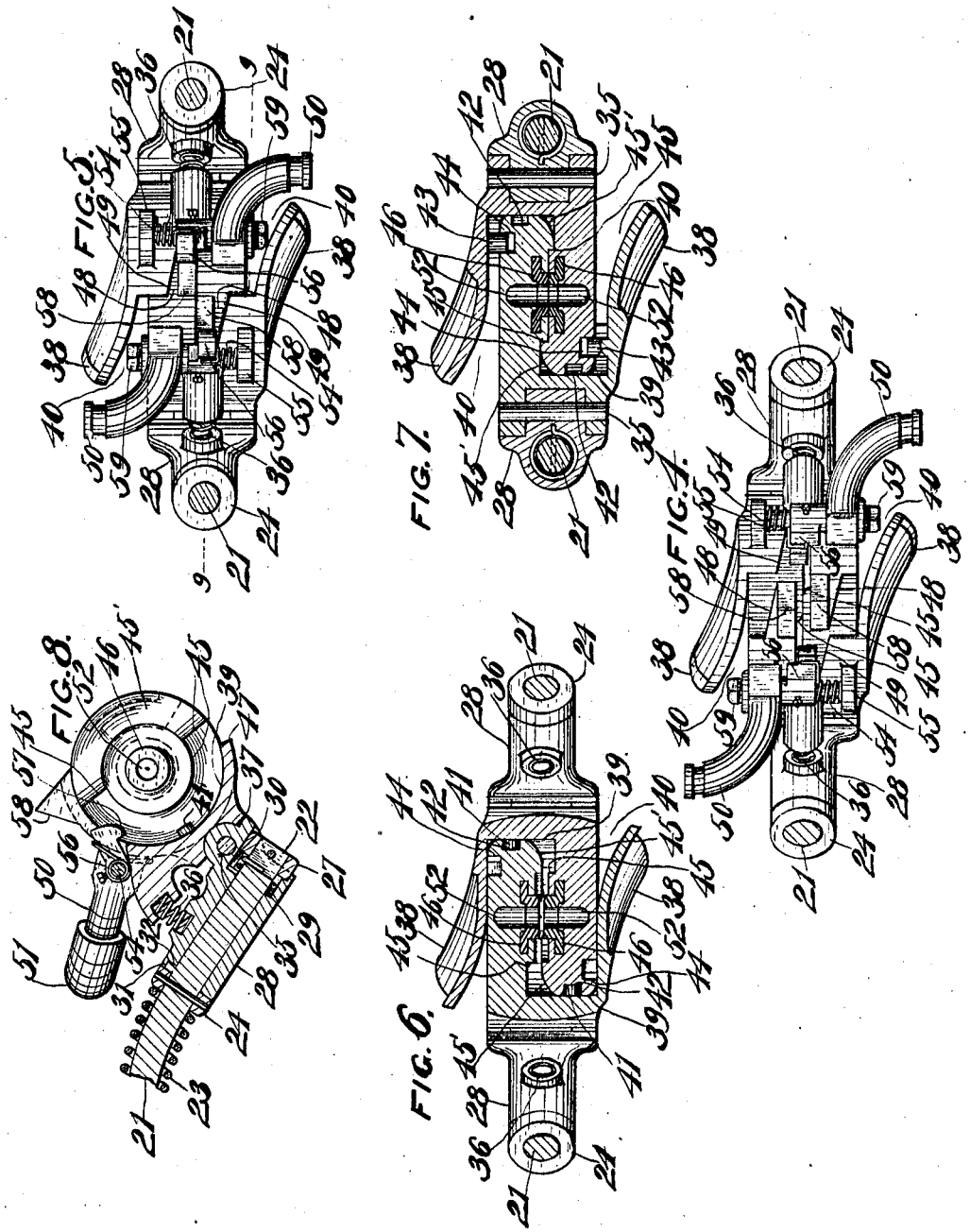

UNITED STATES PATENT OFFICE.

FERDINAND G. RUX, OF RIB FALLS, WISCONSIN.

AUTOMATIC CAR HOSE-COUPLING.

988,511.　　　　　Specification of Letters Patent.　　Patented Apr. 4, 1911.

Application filed July 19, 1909. Serial No. 508,312.

*To all whom it may concern:*

Be it known that I, FERDINAND G. RUX, residing in Rib Falls, in the county of Marathon and State of Wisconsin, have invented new and useful Improvements in Automatic Car Hose-Couplers, of which the following is a description, reference being had to the accompanying drawings, which are a part of this specification.

This invention relates to improvements in automatic car hose couplers more particularly adapted for use in automatically connecting hose ends between railway cars and which are used for supplying air to the air brakes and steam for the heating system.

One of the objects of this invention is to provide an automatic hose coupling which is adapted to automatically connect together and form air tight connections between the ends of air and steam pipes forming part of car equipments.

A further object of this invention is to provide an automatic hose coupling which is adapted to form a yielding connection between the cars provided therewith to compensate for inequalities of movement of connected cars.

A further object of this invention is to provide an automatic hose coupler which is adapted to automatically open the valves with which the hose ends are provided simultaneously with the completion of the coupling.

A further object of this invention is to provide an automatic hose coupler which is adapted to automatically close the valves with which the hose ends are provided simultaneously with the separation of the cars and the completion of the uncoupling movement.

A further object of this invention is to provide an automatic hose coupler in which the parts are wedged together and locked so that the oscillations of the cars will not disturb the connection.

A further object of the invention is to provide an automatic hose coupling with means whereby sections of the coupler are guided into locking position.

With the above, and other objects in view, the invention consists of the coupling and its parts and combinations, and all equivalents thereof.

In the accompanying drawings in which the same reference numerals indicate the same parts in all of the views; Figure 1 is a side view of the complete coupler shown connected to the draw bars of an automatic car coupler of ordinary construction, the couplers being shown in position just before the coupling sections engage each other; Fig. 2 is a similar view thereof with the coupling sections in locked engagement with each other; Fig. 3 is a plan view of the coupler in the position shown in Fig. 1; Fig. 4 is a plan view of the coupling sections in engagement with each other and just before the sections are moved into wedging and locked positions; Fig. 5 is a similar view thereof with the coupling sections moved into wedging engagement and locked positions; Fig. 6 is a horizontal sectional view taken on line 6—6 of Fig. 9 showing the parts just before the sections are moved into wedging engagement and locked positions; Fig. 7 is a horizontal sectional view taken on line 7—7 of Fig. 9 showing the coupling sections moved into wedging engagement and locked positions; Fig. 8 is a vertical sectional view of one of the coupling sections taken on line 8—8 of Fig. 10; Fig. 9 is a vertical sectional view of the coupling sections taken on line 9—9 of Fig. 5; Fig. 10 is an end view of one of the coupling sections; Fig. 11 is a sectional view of the coupler taken on line 11—11 of Fig. 9; and Fig. 12 is a sectional detail taken on line 12—12 of Fig. 9.

Referring to the drawings the numeral 15 indicates the draw bars of an automatic car coupler of the ordinary type, and 16 the connecting knuckles thereof. Supporting brackets 17 bolted to the under side of the draw bars just in the rear of the heads thereof have adjustably bolted thereto eared members 18 provided with pivot bolts 19 and 20. Supporting bars 21 slightly curved and provided with slotted ends 22 are supported and pivoted on the pivot bolts 19. Coiled springs 23 surround the bars 21 and are positioned between collars 24 rigidly pinned to the bars and sliding collars 25 slidably mounted on the upper portions of said bars. These slidable collars are pivotally connected to the pivot bolts 20 by means of connecting links 26 which have pivotal connection with both the bolts and the collars. The tendency of the coiled springs to expand causes the collars pinned to the bars to swing as far away as possible from the sliding collars and consequently said bars will extend yieldingly in a direction toward each other and in advance of the car coupler sections.

The lower ends of the bars 21 have collars 27 pinned thereto and mounted on said rods between these collars and the collars 24 are sleeves 28. The lower ends of the sleeves are recessed to accommodate the collars 27 and coiled springs 29. The lower ends of these springs are positioned within the slots 22 of the bars and the upper ends thereof are positioned in vertical grooves 30 formed in the sleeves 28 to hold said sleeves yieldingly revolubly in position. The revoluble movements of said sleeves are limited by means of tongues 31 forming part of the bars 21 engaging the end walls of concentric recesses 32 formed in the upper portions of the sleeves 28.

The lower portions of the sleeves are provided with forwardly projecting lugs 33 to which are pivoted circular coupling members or sections 34 by pivot pins 35. Coiled springs 36 interposed between the sleeves and the coupling members or sections permit a slight yielding upwardly of said members when in engagement with each other to prevent the wearing of the coupling sections. Stop shoulders 37 limit the downward movement of said members.

The circular coupling members are provided with guiding portions or wings 38 which are connected by semicircular walls 39 to the rear portions of the members and extend forwardly and outwardly therefrom and serve to guide the members into proper position to engage each other. These wings are spaced a distance from the main portions of the coupling members by the semicircular walls 39 to provide engaging recesses 40 into which opposite coupling members are adapted to extend in coupling the parts together. The semicircular walls 39 of the engaging recesses are provided with forwardly projecting wedging pins 41 which are positioned to enter and engage the wedging side walls of recesses 42 provided in the front edges of the circular coupling members and positioned at an angle with relation to the side walls thereof. These wedge walls are inclined outwardly upwardly, so that when the coupling members are in engagement with each other and the supporting brackets are being moved toward each other the coupling members will be swung downwardly and revolve in opposite directions a sufficient distance to cause the wedging walls of the recesses in engagement with the wedging pins to wedge the inner side walls of the coupling members tightly together.

The inner engaging side walls of the wings or guiding portions 38 of the coupling members are provided with locking pins 43 positioned to engage concentric walls of recesses 44 provided in the outer sides of the coupling members. The front edges of the coupling members adjacent to the lower ends of the concentric walls are cut away to permit the locking pins to enter and leave the recesses in coupling and uncoupling the members.

The rear halves of the engaging side walls of the coupling members are depressed to form locking shoulders 45 which engage each other when the members are in a coupled position and the cheeks 45' formed by the front portions serve to protect the rubber packing gaskets 46 from injury while said members are sliding by each other while being coupled and uncoupled. Each member is provided with one of the gaskets 46 to form an air tight connection between the two members and the shouldered portions of the members space said members a distance apart to clear the gaskets when engaging and disengaging each other. The lower front ends 47 of the semicircular walls 39 serve as butting shoulders, when the members first move into engagement with each other, and cause said members to swing downwardly into proper locking position, and the upper front ends of said semicircular walls are beveled off horizontally to form wedging portions 48 which engage angular side faces 49 formed in the semicircular walls to coact with the wedge pins and recess walls in wedging the two members together.

The coupling members are provided with curved air tube extensions 50 projecting from the upper portions thereof which have hose pipes 51 connected thereto and leading to air brake mechanism (not shown). The openings 52 in the tubes extend to the medial portions of the coupling members and turning at right angles inwardly toward each other emerge from the engaging sides of said members and connect with each other by means of the gaskets 46 which form an air tight closure between the two members at this point of connection.

The curved air tubes are intersected transversely by plug valves 53 which control the passage of air in said openings and provide means whereby said openings may be closed when the coupling members are uncoupled from each other.

The plug valves are provided with stems 54 extending therefrom, and the outer ends of which are mounted in bearings 55 formed on the upper portions of the members. Operating dogs 56 provided with hooked portions 57 are bolted fast to said stems and held in closed positions when uncoupled, are adapted to ride up the inclined edges of pointed lugs 58 provided on the upper edges of the coupling members to positions when the hooked portions will snap over the pointed ends and hold the members releasably in locked positions. The dogs in riding up the inclined edges of the lugs will turn the valve stems and the valve connected thereto to an open position, as shown in Fig. 11, so that the air is free to pass from one tube to the other. Coiled springs 58 surrounding the valve stems are adapted to swing the operating dogs downwardly and close the plug valves when the coupling members are disengaged from each other.

The valve plugs are held in position in their seats by means of adjusting bolts 59 and the shoulders formed on the smaller ends of the plugs are adapted to bear against packing ring 60 provided therefor to form air tight joints.

It will be noticed that each section is identical in form and structure and cars provided with the couplers may be coupled to other cars likewise provided at either end as the parts will always fit together.

The operation of the coupling device in connection with a car coupler is as follows: The coupler sections are fastened to the draw bars of a car coupler in the manner shown in the drawings and will assume the positions as shown in Figs. 1 and 3. Now in moving the cars toward each other to couple the car coupler, the car hose couplers which are in advance of the car couplers, will engage each other with the coupling portion of each member positioned within the engaging recess of the other member. In this position the butting shoulders of the semicircular walls engage each other and cause the coupling sections to swing downwardly against the tension of the coiled springs surrounding the pivoted supporting bars. The downward swing of the coupling sections will cause the sections to revolve in opposite directions and wedge and lock the two sections together by means of the engagement of the wedge and locking pins with the wedge and locking walls of the recesses. Simultaneously with these movements the operating dogs are sliding up the inclined lugs and opening the plug valves and when fully opened the hook portions of the dogs will snap over the points and lock the sections together with the valves turned on and the air openings in communication with each other and the joint sealed with the gaskets. In this coupled position the pivotal connections of the different parts permit the cars to which the couplers are attached to turn on curves and oscillate vertically and horizontally without in any way disturbing the connection as the coupler gives and yields with each movement of the cars and adjusts itself to the different positions without uncoupling.

The coupler will remain coupled as long as the car couplers are in engagement with each other but as soon as they separate the hose coupling members will be swung upwardly by the coiled springs surrounding the supporting bars and the operating dogs will spring off the points of the pointed lugs and slide down the inclines and close the air plug valves. Simultaneously with this movement the coupling members or sections will revolve in opposite directions and unlock from the wedge and locking pins and the members may be withdrawn from each other.

The yielding movement permitted by the pivotal connections and the springs adapts the coupler to be successfully used with cars in which the car couplers are of different heights as one of the coupling sections may yield more than the other and swing downwardly a greater distance to compensate for the difference in height between the two portions.

The coupler not only obviates the necessity of going between the cars to couple the parts together but it automatically closes the air valve of the rear end of the last car of the train and if a train should break or separate the air valves at the point of separation would automatically close thus permitting the air brakes of the cars to be properly controlled.

The coupling may also be used to connect together the ends of the steam pipes used for heating the cars in the same manner as the air pipes.

From the foregoing description it will be seen that the coupling is very simple in construction and operation and is well adapted to perform the functions described.

It is to be understood that this invention is not limited to any specific form or arrangement of parts except in so far as such limitations are specified in the claims.

What I claim as my invention is:

1. An automatic car hose coupler, comprising supporting brackets, members pivotally connected to said brackets, coupling sections horizontally pivotally connected to said members and provided with fluid passageways adapted to be brought into register with each other when the coupling sections are coupled together, and means for wedging and locking the sections together.

2. An automatic car hose coupler, comprising supporting brackets, bars pivotally connected to said brackets and provided with means for yieldingly holding the bars in a forward position, sleeves mounted on said bars and adapted to have a slight turning movement thereon, coupling sections pivotally connected to said sleeves and provided with fluid passageways adapted to be brought into register with each other when the sections are coupled together, guides forming part of the sections for guiding opposite sections together, wedging means for drawing the sections together, and locking means for holding the sections in wedging engagement.

3. An automatic car hose coupler, comprising supporting brackets, bars pivotally connected to said brackets and provided with means for yieldingly holding the bars in a forward position, sleeves mounted on said bars and adapted to have a slight turning movement thereon, coupling sections pivotally connected to said sleeves and provided with fluid passageways adapted to be brought into register with each other when the sections are coupled together, valves normally closing said passageways to the flow of fluid, means for automatically operating said valves to open the passageways when the sections are coupled together, guides forming part of the sections for guiding opposite sections together, wedging means for drawing the sections together, and locking means for holding the sections in wedging engagement.

4. An automatic car hose coupler, comprising supporting brackets, bars pivotally connected to said brackets and provided with means for yieldingly holding the bars in a forward position, sleeves mounted on said bars and adapted to have a slight turning movement thereon, coupling sections pivotally connected to said sleeves and provided with fluid passageways adapted to be brought into register with each other when the sections are coupled together, valves intersecting said passageways and normally closing the same to the flow of fluid, dogs connected to said valves and positioned to be automatically operated to open said valves when the coupling sections are coupled together, guides forming part of the sections for guiding opposite sections together, wedging means for drawing the sections together, and locking means for holding the sections in wedging engagement.

5. An automatic car hose coupler, comprising supporting brackets, bars pivotally connected to said brackets, slidable collars mounted on the bars and having pivotal connections with the brackets, collars mounted on said bars and fixed thereto, coiled springs surrounding said bars and interposed between the fixed and the sliding collars, sleeves mounted on the bars between the fixed collars, means for holding the sleeves yieldingly in position, coupling sections pivotally connected to said sleeves and provided with fluid passageways adapted to be brought into register with each other when the sections are coupled together, yielding means interposed between the sleeves and the sections, guides forming part of the coupling sectionn for guiding opposite sections together, wedging means for drawing the sections together, and locking means for holding the sections in wedging engagement.

6. An automatic car hose coupler, comprising supporting brackets, bars pivotally connected to said brackets, slidable collars mounted on the bars and having pivotal connections with the brackets, collars mounted on said bars and fixed thereto, coiled springs surrounding said bars and interposed between the fixed and the sliding collars, sleeves mounted on the bars between the fixed collars, means for holding the sleeves yieldingly in position, coupling sections pivotally connected to said sleeves and provided with fluid passageways adapted to be brought into register with each other when the sections are coupled together, valves normally closing said passageways to the flow of fluid, means for automatically operating said valves to open the passageways when the sections are coupled together, yielding means interposed between the sleeves and the sections, guides forming part of the coupling sections for guiding opposite sections together, wedging means for drawing the sections together, and locking means for holding the sections in wedging engagement.

7. An automatic car hose coupler, comprising supporting brackets, bars pivotally connected to said brackets, slidable collars mounted on the bars and having pivotal connections with the brackets, collars mounted on said bars and fixed thereto, coiled springs surrounding said bars and interposed between the fixed and the sliding collars, sleeves mounted on the bars between the fixed collars, means for holding the sleeves yieldingly in position, coupling sections pivotally connected to said sleeves and provided with fluid passageways adapted to be brought into register with each other when the sections are coupled together, valves intersecting said passageways and normally closing the same to the flow of fluid, dogs connected to said valves and positioned to be automatically operated to open said valves when the coupling sections are coupled together, yielding means interposed between the sleeves and the sections, guides forming part of the coupling sections for guiding opposite sections together, wedging means for drawing the sections together, and locking means for holding the sections in wedging engagement.

8. An automatic car hose coupler, comprising yielding members, coupling sections pivotally connected to said member and provided with fluid passageways adapted to be brought into register with each other, guides forming part of the sections for guiding opposite sections together, wedging pins projecting from the sections, and recesses having angular walls positioned to be engaged by the pins to wedge the two sections together.

9. An automatic car hose coupler, comprising yielding members, coupling sections pivotally connected to said member and provided with fluid passageways adapted to be brought into register with each other, guides forming part of the sections for guiding opposite sections together, wedging pins projecting from the sections, and recesses having angular walls positioned to be engaged by the pins to wedge the two sections together, a gasket interposed between the sections to form a tight closure, and cheeks provided on said sections to guard said gasket while coupling the sections together.

10. An automatic car hose coupler, comprising yielding members, coupling sections pivotally connected to said member and provided with fluid passageways adapted to be brought into register with each other, guides forming part of the sections for guiding opposite sections together, wedging pins projecting from the sections, and recesses having angular walls positioned to be engaged by the pins to wedge the two sections together, locking pins projecting from said sections, and concentric walls formed on said sections and adapted to be engaged by the locking pins, to lock the sections together.

11. An automatic car hose coupler, comprising yielding members, coupling sections pivotally connected to said member and provided with fluid passageways adapted to be brought into register with each other, guides forming part of the sections for guiding opposite sections together, wedging pins projecting from the sections, recesses having angular walls positioned to be engaged by the pins to wedge the two sections together, locking pins projecting from said sections, concentric walls formed on said sections and adapted to be engaged by the locking pins to lock the sections together, a gasket interposed between the sections to form a tight closure, and cheeks provided on said sections to guard said gasket while coupling the sections together.

12. An automatic car hose coupler, comprising yielding members, coupling sections pivotally connected to said member and provided with fluid passageways adapted to be brought into register with each other, guides forming part of the sections for guiding opposite sections together, wedging pins projecting from the sections, recesses having angular walls positioned to be engaged by the pins to wedge the two sections together, locking pins projecting from said sections, concentric walls formed on said sections and adapted to be engaged by the locking pins to lock the sections together, gaskets interposed between the sections to form a tight closure, cheeks provided on said sections to guard the gasket while coupling the sections together, and valves normally closed when the sections are uncoupled for controlling said passageways.

13. An automatic car hose coupler, comprising yielding members, coupling sections pivotally connected to said member and provided with fluid passageways adapted to be brought into register with each other, valves controlling said passageways, dogs connected to said valves and positioned to engage inclined portions provided on opposite coupling sections to open said valves, guides forming part of the sections for guiding opposite sections together, wedging pins projecting from the sections, and recesses having angular walls positioned to be engaged by the pins to wedge the two sections together.

14. An automatic car hose coupler, comprising yielding members, coupling sections pivotally connected to said member and provided with fluid passageways adapted to be brought into register with each other, valves controlling said passageways, dogs connected to said valves and positioned to engage inclined portions provided on opposite coupling sections to open said valves, guides forming part of the sections for guiding opposite sections together, wedging pins projecting from the sections, and recesses having angular walls positioned to be engaged by the pins to wedge the two sections together, a gasket interposed between the sections to form a tight closure, and cheeks provided on said sections to guard said gasket while coupling the sections together.

15. An automatic car hose coupler, comprising yielding members, coupling sections pivotally connected to said member and provided with fluid passageways adapted to be brought into register with each other, valves controlling said passageways, dogs connected to said valves and positioned to engage inclined portions provided on opposite coupling sections to open said valves, guides forming part of the sections for guiding opposite sections together, wedging pins projecting from the sections, recesses having angular walls positioned to be engaged by the pins to wedge the two sections together, locking pins projecting from said sections, and concentric walls formed on said sections and adapted to be engaged by the locking pins to lock the sections together.

16. An automatic car hose coupler, comprising yielding members, coupling sections pivotally connected to said member and provided with fluid passageways adapted to be brought into register with each other, valves controlling said passageways, dogs connected to said valves and positioned to engage inclined portions provided on opposite coupling sections to open said valves, guides forming part of the sections for guiding opposite sections together, wedging pins projecting from the sections, and recesses having angular walls positioned to be engaged by the pins to wedge the two sections together, locking pins projecting from said sections, concentric walls formed on said sections and adapted to be engaged by the locking pins to lock the sections together, a gasket interposed between the sections to form a tight closure, and cheeks provided on said sections to guard said gasket while coupling the sections together.

17. An automatic car hose coupler, comprising yielding members, coupling sections pivotally connected to said member and provided with fluid passageways adapted to be brought into register with each other, valves controlling said passageways, dogs connected to said valves and positioned to engage inclined portions provided on opposite coupling sections to open said valves, guides forming part of the sections for guiding opposite sections together, wedging pins projecting from the sections, and recesses having angular walls positioned to be engaged by the pins to wedge the two sections together, locking pins projecting from said sections, concentric walls formed on said sections and adapted to be engaged by the locking pins to lock the sections together, a gasket interposed between the sections to form a tight closure, and cheeks provided on said sections to guard said gasket while coupling the sections together.

18. An automatic car hose coupler, comprising yielding members, coupling sections pivotally connected to said member and provided with fluid passageways adapted to be brought into register with each other, valves controlling said passageways, inclined pointed lugs formed on said members, dogs connected to said valves and positioned to engage the inclined pointed lugs and lock over the points thereof, guides forming part of the sections for guiding opposite sections together, wedging pins projecting from the sections, and recesses having angular walls positioned to be engaged by the pins to wedge the two sections together.

19. An automatic car hose coupler, comprising yielding members, coupling sections pivotally connected to said member and provided with fluid passageways adapted to be brought into register with each other, valves controlling said passageways, inclined pointed lugs formed on said members, dogs connected to said valves and positioned to engage the inclined pointed lugs and lock over the points thereof, guides forming part of the sections for guiding opposite sections together, wedging pins projecting from the sections, recesses having angular walls positioned to be engaged by the pins to wedge the two sections together, locking pins projecting from said sections, concentric walls formed on said sections and adapted to be engaged by the locking pins to lock the sections together, gaskets interposed between the sections to form a tight closure, cheeks provided on said sections to guard the gasket while coupling the sections together, and valves normally closed when the sections are uncoupled for controlling said passageways.

In testimony whereof, I affix my signature, in presence of two witnesses.

FERDINAND G. RUX.

Witnesses:
C. H. KEENEY,
ANNA SCHMIDTBAUER.

---

Copies of this patent may be obtained for five cents each, by addressing the "Commissioner of Patents, Washington, D. C."